United States Patent [19]
Harris et al.

[11] 3,818,820
[45] June 25, 1974

[54] FRIED PRODUCT DISPENSING APPARATUS

[75] Inventors: Derek James Harris, Maidenhead; Jack Firth, Sunbury, both of England

[73] Assignee: CVS Chip Vending Services Limited

[22] Filed: Feb. 22, 1972

[21] Appl. No.: 227,900

[52] U.S. Cl. ................................ 99/407, 99/411
[51] Int. Cl. ............................................ A47j 37/12
[58] Field of Search ............ 99/407, 356, 404, 410, 99/411, 323.6, 323.5, 319, 409

[56] References Cited
UNITED STATES PATENTS

| | | | |
|---|---|---|---|
| 1,610,564 | 12/1926 | McLaughlin | 99/407 X |
| 2,108,627 | 2/1938 | Tyler | 99/407 X |

*Primary Examiner*—Leon G. Machlin

[57] ABSTRACT

Food dispensing apparatus, particularly for dispensing fried potato products, includes a frying bath, a food hopper and a frying basket, the basket being movable to lift fried food from the bath and dispense it into a waiting container.

5 Claims, 4 Drawing Figures

PATENTED JUN 25 1974

FRIED PRODUCT DISPENSING APPARATUS

This invention relates to food dispensing apparatus.

A number of devices are known for the dispensing of fried edible products, particularly "chips," but heretofore, none of these has given satisfactory service. The desiderata for these dispensers include the following: the dispenser should require only a short time to dispense the product, which should be hot and fresh cooked, but nevertheless substantially drained of excess frying liquid; the frying liquid should not be liable to contamination or require frequent changes, and the apparatus should not generate an excessive amount of fume. In addition, it is generally advisable to be able to control the size of the portion of product dispensed.

According to the present invention there is provided fried product dispensing apparatus comprising a frying bath, a food hopper located above and to one side of the bath, a frying basket movable from an upright position in the frying bath to an at least partly inverted position outside the bath, means for effecting such a movement, and means for ejecting a portion of food from the hopper into the basket when the basket is in a position between its upright position and its at least partly inverted position. The degree of movement of the basket required is that necessary to cause fried edible products in the basket to move from the basket under the influence of gravity.

In a particularly preferred construction, the frying basket is slidably mounted in such a way that on partially inverting the basket, it slides bodily under the influence of gravity until brought to rest by a stop member. This ensures that on inverting the basket, all the fried food product contained therein is ejected by the jerk of the basket on stopping. Preferably, means are provided to stop sliding of the basket until the inverting thereof has reached a desired extent.

The means for feeding food from the hopper to the basket preferably comprises a slidably mounted ejection scoop, movable between a position in which the scoop lies under the food in the hopper to a position laterally outside the hopper. Preferably, the size of the scoop may be preset to dispense portion of varying size.

The food hopper is preferably formed with at least one wall substantially vertical for the whole of its length from the top of the hopper to the outlet thereof.

In use, food to be fried and dispensed is fed from the hopper to the basket, e.g. via a sliding ejector mechanism, and the basket is then moved into the frying liquid (preferably frying oil). After a predetermined time interval the basket is removed from the frying oil and moved to a position in which the fried food falls out of the basket and, for example, onto a plate placed suitably for the purpose by the user of the apparatus. The fall-out of the food is preferably guaranteed by the basket's sliding downwards under the influence of gravity a short way and being stopped abruptly by means of a suitable stop member.

A particularly preferred construction is one in which the basket is attached to a feed means, the feed means being constituted by a chute, running upwardly and outwardly from the base of the basket, the base being considered as horizontal. This integral chute and basket is preferably pivoted about a horizontal axis above and to one side of the frying bath, the basket itself being thus able to describe a vertical arc between its position in the frying bath and its position for food discharge. Preferably, the basket and chute unit is slidably mounted on a plate member which plate member is pivotally mounted for rotation about a horizontal axis.

Although the apparatus of the present invention is designed primarily for automatic fried food production, for example in catering applications, it will be apparent that the apparatus may be operated by coin-operated release means, when the apparatus is constructed as a vending machine. The electrical and electromechanical details of the apparatus according to the invention are standard; they consist generally of a thermostatically controlled heater for the frying oil, (preferably two thermostats for safety reasons), a motor for the movement of the frying basket and portion control apparatus (if used) and a timing device, regulating the time between the immersion of the basket into the frying liquid and its subsequent raising. The timing device is preferably adjustable to enable different frying times to be used for different foods. The regulation of the movement of the basket is conveniently accomplished by cams and microswitches in known fashion, preferably built into the basket motor.

Apparatus according to the present invention as described, purely by way of example, with reference to the accompanying drawings, in which.

Figure 1:
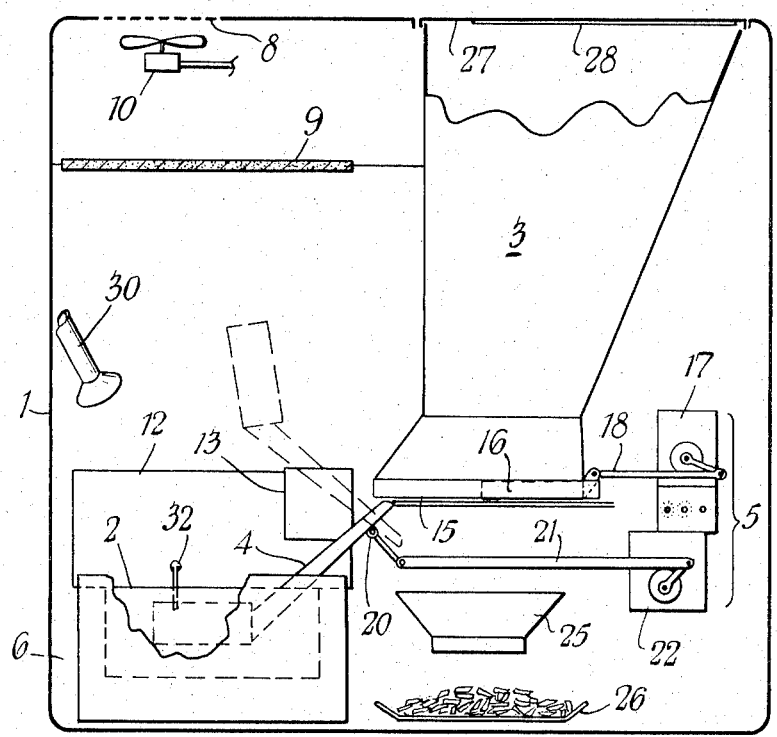
FIG. 1 is a cutaway front view of a fried product dispenser according to the invention.

Referring to the FIG. 1 the apparatus consists basically of a stainless steel casing 1 housing a stainless steel frying bath 2, food hopper 3, pivotally mounted frying basket and chute 4 and motor and control devices indicated generally at 5. The interior of frying basket and chute 4 may be coated with a non-stick surface, e.g. a fluorocarbon polymer.

Preferably the whole of the electrical control and actuation circuitry is arranged as a replaceable unit which can be interchanged on breakdown of any one part.

The sides and base of the frying bath are surrounded by a layer of heat insulating material 6, and fumes rising from the bath, may escape from housing 1 via a grille 8 set in the top. The fumes are extracted by means of a fan 10 and via a replaceable charcoal filter unit 9. An automatic fire extinguisher 30 is mounted on one side of the fume outlet channel, to extinguish the frying oil if it should catch fire. Above and behind the frying bath 2 is situated a frying oil reservoir tank 12 which is fitted with an oil circulating pump 13 and an oil filter (not shown). The reservoir tank is provided with a conventional drip feed 32 to the bath 2.

Below the outlet of hopper 3 is located a variable height base plate 15. Sliding on plate 15 is a slide 16, movement of which is controlled by a motor 17 via a linkage 18 as shown. When motor 17 is energised, the slide 16 is reciprocated, to push the products at the base of the hopper sideways and into chute and basket 4. Set in the base of hopper 3 but not shown is an agitator to ensure correct feed of material from the hopper into slide 16.

Chute and basket 4 can pivot about horizontal axis 20 from the position shown in full lines (in which the basket is immersed in frying oil) to that shown in dotted lines, by means of a linkage 21 and motor 22. Below the lower outer end of the chute in the position shown in dotted lines is a guide funnel 25, below which a plate 26 may be placed to receive the fried products.

The hopper 3 may be filled by raising a hinged lid 27. The inside of lid 27 bears a mirror 28 to enable the user easily to see how full hopper 3 is. If desired, lid 27 may be fitted with a lock and/or with a microswitch which prevents operation of the apparatus unless the door is closed.

Attached to motor 17 is a counter which is actuated by passage over it of link arm 18 to count the number of portions of fried product are dispensed.

The casing 1 is normally closed on its front face by a pair of side-hung casement doors, the base of the right hand door being cut away to allow insertion and removal of a plate below funnel 25. These doors may also be provided with a lock and/or a microswitch.

As noted above, the apparatus may be operated either by manual command or by means of a coin-release system of known type. Indicator lights may be provided in known fashion to indicate conditions of the apparatus such as "ready to use," "frying" and "empty".

In use, hopper 3 is charged with the product to be fried and the frying bath and oil reservoir with oil.

The height of the base 15 is selected and motor 17 energised to push, by means of slide 16, the required quantity of food product onto the chute, and so into the frying basket 4, which is immersed in the frying bath. At this stage, the food product starts to fry and, after a predetermined time interval, motor 22 is energised, first to lift the basket and food out of the oil, and so allow excess oil to drain off, and thereafter to raise the basket to the position shown in dotted lines whereupon the food slides down the chute and onto the waiting plate 26. The basket then returns to the position shown in full lines and the apparatus is ready for a further cycle.

Figure 2:
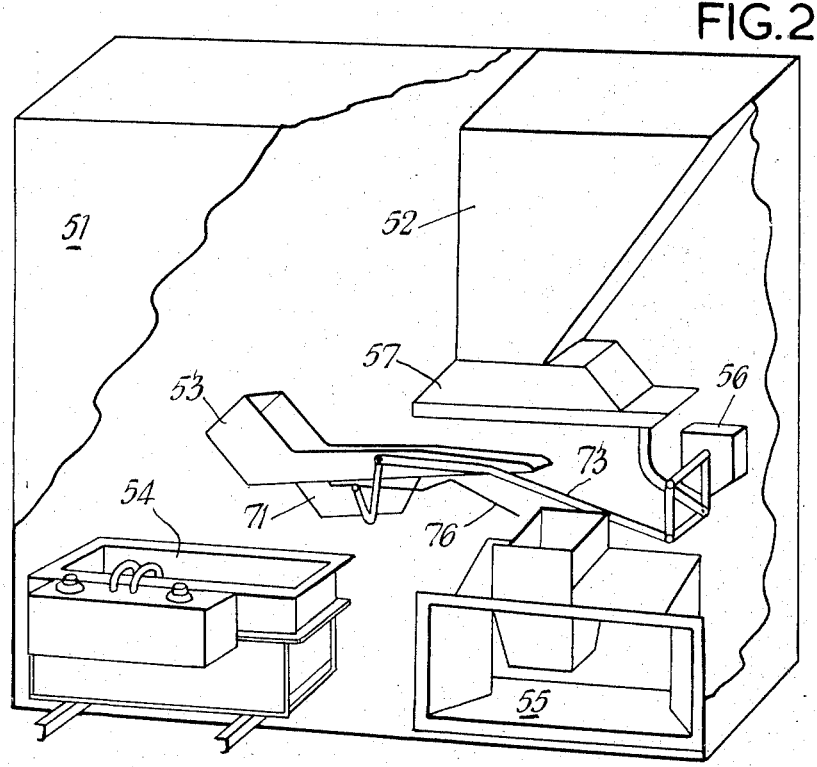
FIG. 2 is a perspective cutaway front view of an alternative fried or product dispenser according to the invention.
Figure 3:
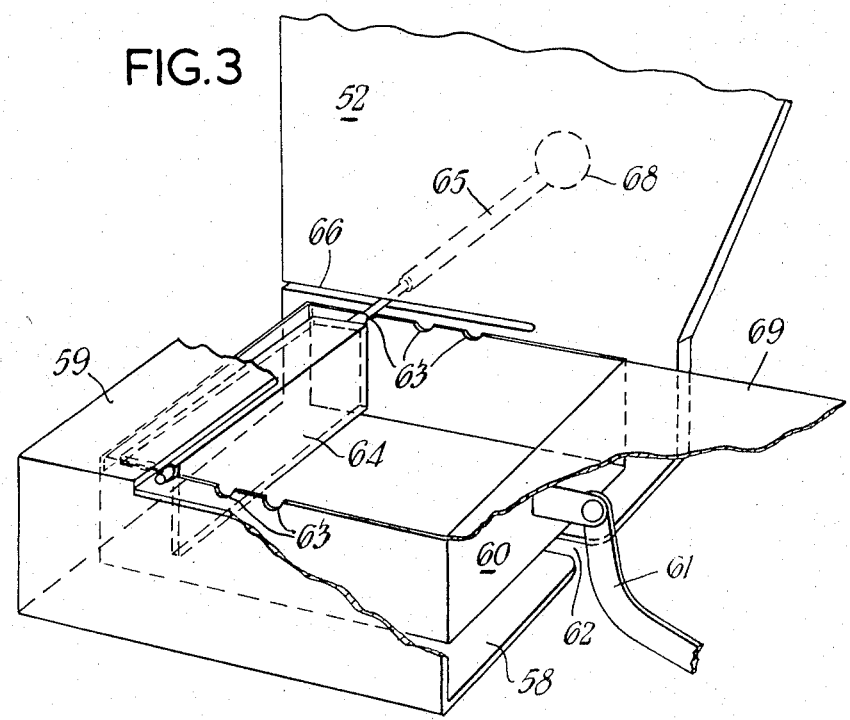
FIG. 3 is a detail of the portion dispenser machanism of the dispenser of FIG. 2.
Figure 4:
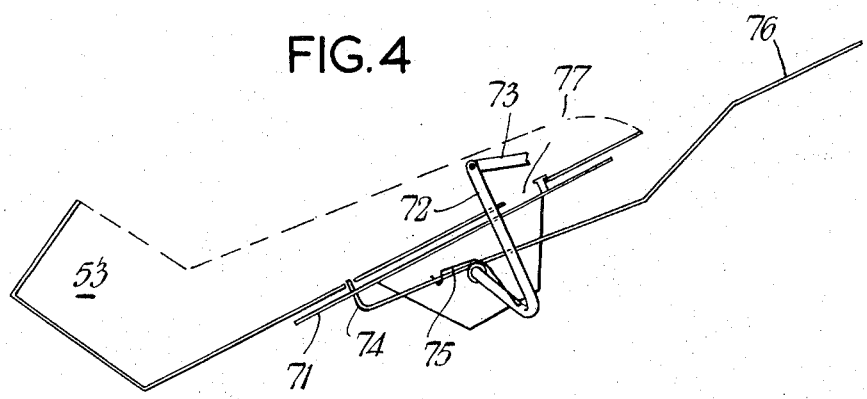
FIG. 4 is a detail view of the frying basket used in the dispenser of FIG. 2.

Referring to FIGS. 2–4, there is shown an alternative embodiment of the dispenser according to this invention. This dispenser comprises a casing 51 housing the basic components hopper 52, basket and chute 53, frying bath 54, outlet guide and plate holder 55, and motor 56. At the base of the hopper 52 is a portion dispenser mechanism 57, which is shown in more detail in FIG. 3. The base of the hopper is formed into a rectangular section tunnel 58 having its roof cut away to allow access of material from the hopper into the tunnel 58, leaving only a roof portion 59 left. Along this tunnel there is slidable back and forth a rectangular member 60, operated by an arm 61 attached to the centre of one short side of the rectangle, and which slides, in use, in a slot 62 in the floor of tunnel 58. Supported between the long side of rectangular pusher member 60, and resting in one pair of slots 63, is a pivotally mounted angled plate 64. Attached to plate 64 is an arm 65 bearing at its end a weight 68 as shown. A slot 66 is provided in the far wall of the hopper to enable the assembly of pusher member 60 and angled plate 64 to move.

In use, in the position shown, food to be dispensed falls into the tunnel, the exact amount being determined by which pair of slots 63 the angled plate 64 is resting in. In order to dispense the food, pusher member 61 is moved to the left as shown. This pushes angled plate 64 out from under roof portion 59 and this plate, under the influence of weight 65, rotates to allow the food to be pushed freely leftwards and into the chute of a waiting basket 53. The ingress of more food behind the pusher member 60 is prevented by a plate 69.

This movement is effected by motor 56, which via the linkage shown rocks basket 53 to lower the food product gently onto the frying liquid in bath 54. The motor then stops under the action of a suitable cam and microswitch arrangement.

After a predetermined times, motor 56 is again driven the output shaft moving further clockwise as shown in FIG. 2. This retracts pusher 60 into tunnel 58 to prepare for the next portion, and in so doing, roof portion 59 causes angled plate 64 to rotate to the position shown in FIG. 2 to form, again, the correctly sized tunnel portion. Meanwhile, basket 53 is slowly removed from the frying liquid in bath 54 and inverted, the upper end of the chute coming over the aperture in outlet guide 55.

As is shown more clearly in FIG. 4, basket 53 is slidably mounted with respect to a plate 71, which is fixed to a pivoted arm 72 which is rotated by the motor 56 via linkage arm 73. Sliding of basket 53 on plate 71 is prevented by the engagement of a springloaded pin 74 in two registered apertures — one in plate 71 and the other on basket 53. Pin 74 is biased by spring 75. However, as the basket and plate are rotated, the end 76 of pin 74 remote from the registered apertures abuts the top of guide 55 and as the assembly is rotated further, pin 74 is removed from the aperture in basket 53. No longer held, this basket slides sharply under the influence of gravity down plate 71 till it reaches the end of its travel, defined by a slot 77 in its base when it stops abruptly, and the fried product therein is ejected smartly onto a plate placed in guide 55. The motor 56 continues to be driven until the apparatus reaches the rest position, as shown in FIG. 2, at which it stops (again by cam and microswitch means not shown), ready for the next frying and dispensing cycle.

We claim as our invention:

1. Fried product dispensing apparatus comprising a frying bath, a food hopper located above and to one side of the bath, a frying basket movable from an upright position in the frying bath to an at least partly inverted position outside the bath, means for effecting such a movement and means for ejecting a portion of food from the hopper into the basket when the basket is in a position between its upright position and its at least partly inverted position, wherein the frying basket is slidably mounted such that when moved from the upright to the at least partially inverted position, it slides bodily under the influence of gravity until arrested by a stop member.

2. Fried product dispensing apparatus according to claim 1 wherein means are provided to stop sliding of the basket until it is inverted to a predetermined extent.

3. Fried product dispensing apparatus according to claim 1 wherein at least one wall of the food hopper is substantially vertical and extends from the top of the hopper to its outlet.

4. Fried product dispensing apparatus according to claim 1 wherein the frying basket is constructed as a basket portion and a feed chute inclined upwardly and outwardly away from the base thereof, the assembly of basket portion and chute being pivotally mounted for rotation about a horizontal axis.

5. Fried product dispensing apparatus according to claim 1 wherein the food ejection means and the frying basket are linked together for movement, and are driven by means of a single electric motor.

* * * * *